US010175550B2

(12) United States Patent
Paolini, Jr. et al.

(10) Patent No.: US 10,175,550 B2
(45) Date of Patent: Jan. 8, 2019

(54) APPLICATIONS OF ELECTRO-OPTIC DISPLAYS

(71) Applicant: E Ink Corporation, Billerica, MA (US)

(72) Inventors: Richard J. Paolini, Jr., Framingham, MA (US); Michael D. McCreary, Acton, MA (US); Carl Taussig, Concord, MA (US); Paul Apen, Newton, MA (US); George G. Harris, Woburn, MA (US); Joseph Fillion, Merrimac, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/934,662

(22) Filed: Nov. 6, 2015

(65) Prior Publication Data

US 2016/0259225 A1 Sep. 8, 2016

Related U.S. Application Data

(60) Provisional application No. 62/077,154, filed on Nov. 7, 2014, provisional application No. 62/099,732, filed on Jan. 5, 2015.

(51) Int. Cl.
*G02F 1/167* (2006.01)
*G02F 1/1333* (2006.01)
(Continued)

(52) U.S. Cl.
CPC .......... *G02F 1/167* (2013.01); *E04F 13/0871* (2013.01); *E04F 13/18* (2013.01);
(Continued)

(58) Field of Classification Search
CPC .............. G02F 1/13336; G02F 1/1335; G02F 1/134336; G02F 1/167; G02F 2001/133562; G02F 2001/1676
(Continued)

(56) References Cited

U.S. PATENT DOCUMENTS 3,819,857 A * 6/1974 Inokuchi ................. G06F 3/046
 178/18.07
4,418,346 A 11/1983 Batchelder
(Continued)

FOREIGN PATENT DOCUMENTS

CN 2361481 Y 2/2000
JP 2007047262 2/2007
(Continued)

OTHER PUBLICATIONS

International Search Report and Written Opinion for corresponding PCT/US2015/059569 dated Mar. 21, 2016.
(Continued)

*Primary Examiner* — Joseph P Martinez
*Assistant Examiner* — Vipin Patel
(74) *Attorney, Agent, or Firm* — Antranig Baronian

(57) ABSTRACT

Electro-optic, especially electrophoretic, displays are used in variety of architectural and furniture applications, including a tile (100) comprising an electro-optic layer (110) capable of changing the color of the file, front and multiple rear electrodes and a light-transmissive polymeric layer (102), the exposed surface of which is textured to provide a plurality of facets inclined to the plane of the tile (100), the rear electrodes being aligned with the facets. A variable color writable board is also provided.

6 Claims, 6 Drawing Sheets

(51) Int. Cl.
  *G02F 1/1335* (2006.01)
  *G02F 1/1343* (2006.01)
  *E04F 13/08* (2006.01)
  *E04F 13/18* (2006.01)

(52) U.S. Cl.
  CPC ........ *G02F 1/1335* (2013.01); *G02F 1/13336* (2013.01); *G02F 1/134336* (2013.01); *G02F 2001/133562* (2013.01); *G02F 2001/1676* (2013.01)

(58) Field of Classification Search
  USPC .................................................. 359/290–296
  See application file for complete search history.

(56) References Cited

U.S. PATENT DOCUMENTS

| | | |
|---|---|---|
| 4,791,417 A | 12/1988 | Bobak |
| 4,965,488 A | 10/1990 | Hihi |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II |
| 5,930,026 A | 7/1999 | Jacobson |
| 5,961,804 A | 10/1999 | Jacobson |
| 6,017,584 A | 1/2000 | Albert |
| 6,054,071 A | 4/2000 | Mikkelsen, Jr. |
| 6,055,091 A | 4/2000 | Sheridon |
| 6,067,185 A | 5/2000 | Albert |
| 6,097,531 A | 8/2000 | Sheridon |
| 6,118,426 A | 9/2000 | Albert |
| 6,120,588 A | 9/2000 | Jacobson |
| 6,120,839 A | 9/2000 | Comiskey |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,249,271 B1 | 6/2001 | Albert |
| 6,252,564 B1 | 6/2001 | Albert |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,301,038 B1 | 10/2001 | Fitzmaurice |
| 6,312,304 B1 | 11/2001 | Duthaler |
| 6,312,971 B1 | 11/2001 | Amundson |
| 6,323,989 B1 | 11/2001 | Jacobson |
| 6,327,072 B1 | 12/2001 | Comiskey |
| 6,376,828 B1 | 4/2002 | Comiskey |
| 6,377,387 B1 | 4/2002 | Duthaler |
| 6,392,785 B1 | 5/2002 | Albert |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,445,489 B1 | 9/2002 | Jacobson |
| 6,459,418 B1 | 10/2002 | Comiskey |
| 6,473,072 B1 | 10/2002 | Comiskey |
| 6,480,182 B2 | 11/2002 | Turner |
| 6,498,114 B1 | 12/2002 | Amundson |
| 6,504,524 B1 | 1/2003 | Gates |
| 6,506,438 B2 | 1/2003 | Duthaler |
| 6,512,354 B2 | 1/2003 | Jacobson |
| 6,515,649 B1 | 2/2003 | Albert |
| 6,518,949 B2 | 2/2003 | Drzaic |
| 6,521,489 B2 | 2/2003 | Duthaler |
| 6,531,997 B1 | 3/2003 | Gates |
| 6,535,197 B1 | 3/2003 | Comiskey |
| 6,538,801 B2 | 3/2003 | Jacobson |
| 6,545,291 B1 | 4/2003 | Amundson |
| 6,580,545 B2 | 6/2003 | Morrison |
| 6,639,578 B1 | 10/2003 | Comiskey |
| 6,652,075 B2 | 11/2003 | Jacobson |
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |
| 6,680,725 B1 | 1/2004 | Jacobson |
| 6,683,333 B2 | 1/2004 | Kazlas |
| 6,693,620 B1 | 2/2004 | Herb |
| 6,704,133 B2 | 3/2004 | Gates |
| 6,710,540 B1 | 3/2004 | Albert |
| 6,721,083 B2 | 4/2004 | Jacobson |
| 6,724,519 B1 | 4/2004 | Comiskey |
| 6,727,881 B1 | 4/2004 | Albert |
| 6,738,050 B2 | 5/2004 | Comiskey |
| 6,750,473 B2 | 6/2004 | Amundson |
| 6,753,999 B2 | 6/2004 | Zehner |
| 6,788,449 B2 | 9/2004 | Liang |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,825,829 B1 | 11/2004 | Albert |
| 6,825,970 B2 | 11/2004 | Goenaga |
| 6,831,769 B2 | 12/2004 | Holman |
| 6,839,158 B2 | 1/2005 | Albert |
| 6,842,167 B2 | 1/2005 | Albert |
| 6,842,279 B2 | 1/2005 | Amundson |
| 6,842,657 B1 | 1/2005 | Drzaic |
| 6,850,297 B2 | 2/2005 | Takizawa et al. |
| 6,864,875 B2 | 3/2005 | Drzaic |
| 6,865,010 B2 | 3/2005 | Duthaler |
| 6,866,760 B2 | 3/2005 | Paolini, Jr. |
| 6,870,657 B1 | 3/2005 | Fitzmaurice |
| 6,870,661 B2 | 3/2005 | Pullen |
| 6,900,851 B2 | 5/2005 | Morrison |
| 6,922,276 B2 | 7/2005 | Zhang |
| 6,950,220 B2 | 9/2005 | Abramson |
| 6,958,848 B2 | 10/2005 | Cao et al. |
| 6,967,640 B2 | 11/2005 | Albert |
| 6,980,196 B1 | 12/2005 | Turner |
| 6,982,178 B2 | 1/2006 | LeCain |
| 6,987,603 B2 | 1/2006 | Paolini, Jr. |
| 6,995,550 B2 | 2/2006 | Jacobson |
| 7,002,728 B2 | 2/2006 | Pullen |
| 7,012,600 B2 | 3/2006 | Zehner |
| 7,012,735 B2 | 3/2006 | Honeyman |
| 7,023,420 B2 | 4/2006 | Comiskey |
| 7,030,412 B1 | 4/2006 | Drzaic |
| 7,030,854 B2 | 4/2006 | Baucom |
| 7,034,783 B2 | 4/2006 | Gates |
| 7,038,655 B2 | 5/2006 | Herb |
| 7,061,663 B2 | 6/2006 | Cao |
| 7,071,913 B2 | 7/2006 | Albert |
| 7,075,502 B1 | 7/2006 | Drzaic |
| 7,075,703 B2 | 7/2006 | O'Neil |
| 7,079,305 B2 | 7/2006 | Paolini, Jr. |
| 7,106,296 B1 | 9/2006 | Jacobson |
| 7,109,968 B2 | 9/2006 | Albert |
| 7,110,163 B2 | 9/2006 | Webber |
| 7,110,164 B2 | 9/2006 | Paolini, Jr. |
| 7,116,318 B2 | 10/2006 | Amundson |
| 7,116,466 B2 | 10/2006 | Whitesides |
| 7,119,759 B2 | 10/2006 | Zehner |
| 7,119,772 B2 | 10/2006 | Amundson |
| 7,148,128 B2 | 12/2006 | Jacobson |
| 7,167,155 B1 | 1/2007 | Albert |
| 7,170,670 B2 | 1/2007 | Webber |
| 7,173,752 B2 | 2/2007 | Doshi |
| 7,176,880 B2 | 2/2007 | Amundson |
| 7,180,649 B2 | 2/2007 | Morrison |
| 7,190,008 B2 | 3/2007 | Amundson |
| 7,193,625 B2 | 3/2007 | Danner |
| 7,202,847 B2 | 4/2007 | Gates |

(56) References Cited

U.S. PATENT DOCUMENTS

| | | |
|---|---|---|
| 7,202,991 B2 | 4/2007 | Zhang |
| 7,206,119 B2 | 4/2007 | Honeyman |
| 7,223,672 B2 | 5/2007 | Kazlas |
| 7,230,750 B2 | 6/2007 | Whitesides |
| 7,230,751 B2 | 6/2007 | Whitesides |
| 7,236,290 B1 | 6/2007 | Zhang |
| 7,236,291 B2 | 6/2007 | Kaga et al. |
| 7,236,292 B2 | 6/2007 | LeCain |
| 7,242,513 B2 | 7/2007 | Albert et al. |
| 7,247,379 B2 | 7/2007 | Pullen |
| 7,256,766 B2 | 8/2007 | Albert |
| 7,259,744 B2 | 8/2007 | Arango |
| 7,280,094 B2 | 10/2007 | Albert |
| 7,304,634 B2 | 12/2007 | Albert et al. |
| 7,304,787 B2 | 12/2007 | Whitesides |
| 7,312,784 B2 | 12/2007 | Baucom |
| 7,312,794 B2 | 12/2007 | Zehner |
| 7,312,916 B2 | 12/2007 | Pullen |
| 7,321,459 B2 | 1/2008 | Masuda |
| 7,327,511 B2 | 2/2008 | Whitesides |
| 7,339,715 B2 | 3/2008 | Webber |
| 7,349,148 B2 | 3/2008 | Doshi |
| 7,352,353 B2 | 4/2008 | Albert |
| 7,365,394 B2 | 4/2008 | Denis |
| 7,365,733 B2 | 4/2008 | Duthaler |
| 7,375,875 B2 | 5/2008 | Whitesides |
| 7,382,363 B2 | 6/2008 | Albert |
| 7,388,572 B2 | 6/2008 | Duthaler |
| 7,391,555 B2 | 6/2008 | Albert et al. |
| 7,411,719 B2 | 8/2008 | Paolini, Jr. |
| 7,411,720 B2 | 8/2008 | Honeyman et al. |
| 7,420,549 B2 | 9/2008 | Jacobson |
| 7,442,587 B2 | 10/2008 | Amundson |
| 7,443,571 B2 | 10/2008 | LeCain et al. |
| 7,453,445 B2 | 11/2008 | Amundson |
| 7,477,444 B2 | 1/2009 | Cao et al. |
| 7,492,339 B2 | 2/2009 | Amundson |
| 7,492,497 B2 | 2/2009 | Paolini, Jr. |
| 7,513,813 B2 | 4/2009 | Paolini, Jr. |
| 7,528,822 B2 | 5/2009 | Amundson |
| 7,532,388 B2 | 5/2009 | Whitesides et al. |
| 7,535,624 B2 | 5/2009 | Amundson |
| 7,545,358 B2 | 6/2009 | Gates |
| 7,551,346 B2 | 6/2009 | Fazel |
| 7,554,712 B2 | 6/2009 | Patry |
| 7,561,324 B2 | 7/2009 | Duthaler et al. |
| 7,583,251 B2 | 9/2009 | Arango |
| 7,583,427 B2 | 9/2009 | Danner |
| 7,598,173 B2 | 10/2009 | Ritenour |
| 7,602,374 B2 | 10/2009 | Zehner |
| 7,605,799 B2 | 10/2009 | Amundson |
| 7,612,760 B2 | 11/2009 | Kawai |
| 7,636,191 B2 | 12/2009 | Duthaler |
| 7,649,666 B2 | 1/2010 | Isobe |
| 7,649,674 B2 | 1/2010 | Danner |
| 7,667,684 B2 | 2/2010 | Jacobson |
| 7,667,886 B2 | 2/2010 | Danner |
| 7,672,040 B2 | 3/2010 | Sohn |
| 7,679,599 B2 | 3/2010 | Kawai |
| 7,679,814 B2 | 3/2010 | Paolini, Jr. |
| 7,688,297 B2 | 3/2010 | Zehner |
| 7,688,497 B2 | 3/2010 | Danner |
| 7,705,824 B2 | 4/2010 | Baucom |
| 7,728,811 B2 | 6/2010 | Albert |
| 7,729,039 B2 | 6/2010 | LeCain et al. |
| 7,733,311 B2 | 6/2010 | Amundson |
| 7,733,335 B2 | 6/2010 | Zehner |
| 7,746,544 B2 | 6/2010 | Comiskey |
| 7,785,988 B2 | 8/2010 | Amundson |
| 7,787,169 B2 | 8/2010 | Abramson et al. |
| 7,791,782 B2 | 9/2010 | Paolini, Jr. |
| 7,791,789 B2 | 9/2010 | Albert |
| 7,826,129 B2 | 11/2010 | Wu |
| 7,839,564 B2 | 11/2010 | Whitesides |
| 7,843,621 B2 | 11/2010 | Danner |
| 7,843,624 B2 | 11/2010 | Danner |
| 7,843,626 B2 | 11/2010 | Amundson et al. |
| 7,848,006 B2 | 12/2010 | Wilcox |
| 7,848,007 B2 | 12/2010 | Paolini, Jr. |
| 7,859,637 B2 | 12/2010 | Amundson |
| 7,893,435 B2 | 2/2011 | Kazlas |
| 7,898,717 B2 | 3/2011 | Patry |
| 7,903,319 B2 | 3/2011 | Honeyman |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert |
| 7,957,053 B2 | 6/2011 | Honeyman |
| 7,986,450 B2 | 7/2011 | Cao |
| 7,999,787 B2 | 8/2011 | Amundson |
| 8,009,344 B2 | 8/2011 | Danner |
| 8,009,348 B2 | 8/2011 | Zehner |
| 8,018,640 B2 | 9/2011 | Whitesides |
| 8,027,081 B2 | 9/2011 | Danner |
| 8,034,209 B2 | 10/2011 | Danner |
| 8,035,886 B2 | 10/2011 | Jacobson |
| 8,040,594 B2 | 10/2011 | Paolini, Jr. |
| 8,049,947 B2 | 11/2011 | Danner |
| 8,054,526 B2 | 11/2011 | Bouchard |
| 8,064,962 B2 | 11/2011 | Wilcox |
| 8,068,272 B2 | 11/2011 | LeCain et al. |
| 8,077,141 B2 | 12/2011 | Duthaler |
| 8,077,381 B2 | 12/2011 | LeCain et al. |
| 8,089,453 B2 | 1/2012 | Comiskey |
| 8,098,418 B2 | 1/2012 | Paolini, Jr. |
| 8,115,729 B2 | 2/2012 | Danner |
| 8,125,501 B2 | 2/2012 | Amundson |
| 8,129,655 B2 | 3/2012 | Jacobson |
| 8,139,050 B2 | 3/2012 | Jacobson |
| 8,174,490 B2 | 5/2012 | Whitesides |
| 8,177,942 B2 | 5/2012 | Paolini, Jr. |
| 8,199,395 B2 | 6/2012 | Whitesides |
| 8,208,193 B2 | 6/2012 | Patry |
| 8,213,076 B2 | 7/2012 | Albert |
| 8,270,064 B2 | 9/2012 | Feick |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,319,759 B2 | 11/2012 | Jacobson |
| 8,363,299 B2 | 1/2013 | Paolini, Jr. |
| 8,373,211 B2 | 2/2013 | Amundson |
| 8,373,649 B2 | 2/2013 | Low |
| 8,384,658 B2 | 2/2013 | Albert |
| 8,389,381 B2 | 3/2013 | Amundson |
| 8,390,301 B2 | 3/2013 | Danner |
| 8,390,918 B2 | 3/2013 | Wilcox |
| 8,441,714 B2 | 5/2013 | Paolini, Jr. |
| 8,441,716 B2 | 5/2013 | Paolini, Jr. |
| 8,446,664 B2 | 5/2013 | Chen et al. |
| 8,466,852 B2 | 6/2013 | Drzaic |
| 8,482,835 B2 | 7/2013 | LeCain |
| 8,498,042 B2 | 7/2013 | Danner |
| 8,553,012 B2 | 10/2013 | Baucom |
| 8,558,783 B2 | 10/2013 | Wilcox et al. |
| 8,558,785 B2 | 10/2013 | Zehner |
| 8,576,470 B2 | 11/2013 | Paolini, Jr. |
| 8,576,476 B2 | 11/2013 | Telfer |
| 8,582,196 B2 | 11/2013 | Walls |
| 8,593,396 B2 | 11/2013 | Amundson |
| 8,593,718 B2 | 11/2013 | Comiskey |
| 8,593,721 B2 | 11/2013 | Albert |
| 8,603,613 B2 | 12/2013 | Larson |
| 8,610,988 B2 | 12/2013 | Zehner |
| 8,654,436 B1 | 2/2014 | Feick |
| 8,728,266 B2 | 5/2014 | Danner |
| 8,754,859 B2 | 6/2014 | Gates |
| 8,786,929 B2 | 7/2014 | LeCain |
| 8,797,634 B2 | 8/2014 | Paolini, Jr. |
| 8,830,553 B2 | 9/2014 | Patry |
| 8,830,559 B2 | 9/2014 | Honeyman |
| 8,830,560 B2 | 9/2014 | Danner |
| 8,854,721 B2 | 10/2014 | Danner et al. |
| 8,873,129 B2 | 10/2014 | Paolini, Jr. |

(56) References Cited

U.S. PATENT DOCUMENTS

| | | |
|---|---|---|
| 8,891,155 B2 | 11/2014 | Danner |
| 8,902,153 B2 | 12/2014 | Bouchard |
| 8,928,562 B2 | 1/2015 | Gates |
| 8,969,886 B2 | 3/2015 | Amundson |
| 8,994,705 B2 | 3/2015 | Jacobson |
| 9,005,494 B2 | 4/2015 | Valianatos |
| 9,075,280 B2 | 7/2015 | Whitesides |
| 9,152,003 B2 | 10/2015 | Danner |
| 9,152,004 B2 | 10/2015 | Paolini, Jr. |
| 9,158,174 B2 | 10/2015 | Walls |
| 9,164,207 B2 | 10/2015 | Honeyman |
| 9,170,467 B2 | 10/2015 | Whitesides |
| 9,182,646 B2 | 11/2015 | Paolini, Jr. |
| 9,230,492 B2 | 1/2016 | Harrington |
| 9,238,340 B2 | 1/2016 | Kayal |
| 2002/0060321 A1 | 5/2002 | Kazlas |
| 2002/0090980 A1 | 7/2002 | Wilcox |
| 2003/0102858 A1 | 6/2003 | Jacobson |
| 2004/0105036 A1 | 6/2004 | Danner |
| 2004/0119681 A1 | 6/2004 | Albert |
| 2005/0006999 A1* | 1/2005 | Minoura ............. H01J 1/70 313/110 |
| 2005/0012980 A1 | 1/2005 | Wilcox |
| 2005/0122306 A1 | 6/2005 | Wilcox |
| 2005/0122563 A1 | 6/2005 | Honeyman |
| 2005/0156340 A1 | 7/2005 | Valianatos |
| 2005/0253777 A1 | 11/2005 | Zehner |
| 2007/0052757 A1 | 3/2007 | Jacobson |
| 2007/0091417 A1 | 4/2007 | Cao |
| 2007/0091418 A1 | 4/2007 | Danner |
| 2007/0103427 A1 | 5/2007 | Zhou et al. |
| 2007/0241673 A1* | 10/2007 | Yamada ............. G02B 5/045 313/506 |
| 2007/0285385 A1 | 12/2007 | Albert |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0130092 A1 | 6/2008 | Whitesides |
| 2008/0136774 A1 | 6/2008 | Harris |
| 2008/0291129 A1 | 11/2008 | Harris |
| 2009/0004442 A1 | 1/2009 | Danner |
| 2009/0009852 A1 | 1/2009 | Honeyman |
| 2009/0085900 A1* | 4/2009 | Weiner ............. G06K 17/00 345/205 |
| 2009/0122389 A1 | 5/2009 | Whitesides |
| 2009/0168067 A1 | 7/2009 | LeCain et al. |
| 2009/0174651 A1 | 7/2009 | Jacobson |
| 2009/0179923 A1 | 7/2009 | Amundson |
| 2009/0195568 A1 | 8/2009 | Sjodin |
| 2009/0206499 A1 | 8/2009 | Whitesides |
| 2009/0225398 A1 | 9/2009 | Duthaler |
| 2009/0237775 A1* | 9/2009 | Ito ............. G02F 1/1339 359/296 |
| 2009/0315044 A1 | 12/2009 | Amundson |
| 2009/0322721 A1 | 12/2009 | Zehner |
| 2010/0103502 A1 | 4/2010 | Jacobson |
| 2010/0148385 A1 | 6/2010 | Balko |
| 2010/0156780 A1 | 6/2010 | Jacobson |
| 2010/0220121 A1 | 9/2010 | Zehner |
| 2010/0265561 A1 | 10/2010 | Gates et al. |
| 2011/0026101 A1 | 2/2011 | Wu |
| 2011/0140744 A1 | 6/2011 | Kazlas |
| 2011/0164301 A1 | 7/2011 | Paolini, Jr. |
| 2011/0187683 A1 | 8/2011 | Wilcox |
| 2011/0187689 A1 | 8/2011 | Bishop |
| 2011/0193840 A1 | 8/2011 | Amundson |
| 2011/0193841 A1 | 8/2011 | Amundson |
| 2011/0199671 A1 | 8/2011 | Amundson |
| 2011/0222145 A1* | 9/2011 | Ito ............. G02B 27/141 359/359 |
| 2011/0286081 A1 | 11/2011 | Jacobson |
| 2011/0292319 A1 | 12/2011 | Cole |
| 2012/0293858 A1 | 11/2012 | Telfer |
| 2012/0326957 A1 | 12/2012 | Drzaic |
| 2013/0063333 A1 | 3/2013 | Arango |
| 2013/0107144 A1* | 5/2013 | Marhefka ............. G06F 1/3275 349/12 |
| 2013/0194250 A1 | 8/2013 | Amundson |
| 2013/0222881 A1* | 8/2013 | Aizenberg ............. E06B 9/24 359/291 |
| 2013/0242378 A1 | 9/2013 | Paolini, Jr. |
| 2013/0258449 A1 | 10/2013 | Paolini, Jr. |
| 2013/0278900 A1 | 10/2013 | Hertel et al. |
| 2013/0278995 A1 | 10/2013 | Drzaic |
| 2013/0321278 A1 | 12/2013 | Sjodin et al. |
| 2014/0009817 A1 | 1/2014 | Wilcox et al. |
| 2014/0055841 A1 | 2/2014 | Telfer et al. |
| 2014/0078024 A1 | 3/2014 | Paolini, Jr. |
| 2014/0078573 A1 | 3/2014 | Comiskey |
| 2014/0085350 A1 | 3/2014 | Amundson |
| 2014/0115884 A1 | 5/2014 | Danner |
| 2014/0139501 A1 | 5/2014 | Amundson |
| 2014/0226198 A1 | 8/2014 | Anseth |
| 2014/0240373 A1 | 8/2014 | Harrington |
| 2014/0253425 A1 | 9/2014 | Zalesky |
| 2014/0292830 A1 | 10/2014 | Harrington et al. |
| 2014/0300837 A1 | 10/2014 | Gates |
| 2014/0308477 A1 | 10/2014 | Derks et al. |
| 2014/0333685 A1 | 11/2014 | Sim |
| 2014/0340430 A1 | 11/2014 | Telfer |
| 2014/0340738 A1 | 11/2014 | LeCain et al. |
| 2014/0347718 A1 | 11/2014 | Duthaler et al. |
| 2014/0362131 A1 | 12/2014 | Paolini, Jr. |
| 2015/0015932 A1 | 1/2015 | Telfer |
| 2015/0070744 A1 | 3/2015 | Danner et al. |
| 2015/0109283 A1 | 4/2015 | Gates |
| 2015/0118390 A1 | 4/2015 | Rosenfeld |
| 2015/0124345 A1 | 5/2015 | Rosenfeld |
| 2015/0171112 A1 | 6/2015 | Amundson |
| 2015/0177589 A1 | 6/2015 | Arango |
| 2015/0205178 A1 | 7/2015 | Paolini, Jr. |
| 2015/0213765 A1 | 7/2015 | Gates |
| 2015/0218384 A1 | 8/2015 | Yezek |
| 2015/0221257 A1 | 8/2015 | Wilcox et al. |
| 2015/0226986 A1 | 8/2015 | Paolini, Jr. |
| 2015/0227018 A1 | 8/2015 | Paolini, Jr. |
| 2015/0228666 A1 | 8/2015 | Paolini, Jr. |
| 2015/0261057 A1 | 9/2015 | Harris |
| 2015/0262551 A1 | 9/2015 | Zehner |
| 2017/0206828 A1 | 7/2017 | Lunsford et al. |

FOREIGN PATENT DOCUMENTS

| | | |
|---|---|---|
| JP | 2007096792 | 4/2007 |
| KR | 1020130048611 | 5/2013 |
| TW | 201137806 | 11/2011 |
| TW | 201403198 | 1/2014 |
| WO | WO0036560 | 6/2000 |
| WO | WO0038000 | 6/2000 |
| WO | WO0005704 | 5/2001 |
| WO | WO9967678 A2 | 10/2001 |
| WO | 2006137686 | 12/2006 |

OTHER PUBLICATIONS

Wood, D., "An Electrochromic Renaissance?" Information Display, 18(3), 24 (Mar. 2002) Mar. 1, 2002.

O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.

Bach, U., et al., "Nanomaterials-Based Electrochromics for Paper-Quality Displays", Adv. Mater., 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, Paper HCS1-1 (2001) Jan. 1, 2001.

(56) References Cited

OTHER PUBLICATIONS

Yamaguchi, Y., et al., "Toner display using insulative particles charged triboelectrically", Asia Display/IDW '01, p. 1729, Paper AMD4-4 (2001) Jan. 1, 2001.
European Patent Office, EP Appl. No. 15856860.0, Extended European Search Report, Sep. 25, 2018 Sep. 25, 2018.

\* cited by examiner

APPLICATIONS OF ELECTRO-OPTIC DISPLAYS

REFERENCE TO RELATED APPLICATIONS

This application claims benefit of provisional Application Ser. No. 62/077,154, filed Nov. 7, 2014 and of provisional Application Ser. No. 62/099,732, filed Jan. 5, 2015. The entire contents this applications and of all U.S. patents and published and copending applications mentioned below, are herein incorporated by reference.

BACKGROUND OF INVENTION

This invention relates to applications of electro-optic displays. More specifically, this invention relates to uses of electro-optic displays, especially but not exclusively, particle-based electrophoretic displays, in architectural, furnishing and similar applications.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; 8,305,341; 8,390,918; 8,582,196; 8,593,718; and 8,654,436; and U.S. Patent Applications Publication Nos. 2005/0012980; 2009/0009852; 2009/0206499; 2009/0225398; 2010/0148385; 2014/0078857; 2014/0211296; 2014/0347718; 2015/0015932; 2015/0177589; and 2015/0218384;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,202,991; 7,242,513; 7,304,634; 7,339,715; 7,391,555; 7,411,719; 7,477,444; 7,561,324; 7,848,007; 7,910,175; 7,952,790; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Films and sub-assemblies containing electro-optic materials; see for example U.S. Pat. Nos. 6,825,829; 6,982,178; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,852; 8,786,929; 8,830,553; 8,854,721; and 9,075,280; and U.S. Patent Applications Publication Nos. 2009/0109519; 2009/0168067; 2011/0164301; 2014/0027044; 2014/0115884; and 2014/0340738;

(d) Backplanes, adhesive layers and other auxiliary layers and methods used in displays; see for example U.S. Pat. No. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; 8,373,211; 8,389,381; 8,498,042; 8,610,988; 8,728,266; 8,754,859; 8,830,560; 8,891,155; 8,989,886; 9,152,003; and 9,152,004; and U.S. Patent Applications Publication Nos. 2002/0060321; 2004/0105036; 2005/0122306; 2005/0122563; 2007/0052757; 2007/0097489; 2007/0109219; 2009/0122389; 2009/0315044; 2011/0026101; 2011/0140744; 2011/0187683; 2011/0187689; 2011/0292319; 2013/0278900; 2014/0078024; 2014/0139501; 2014/0300837; 2015/0171112; 2015/0205178; 2015/0226986; 2015/0227018; 2015/0228666; and 2015/0261057; and International Application Publication No. WO 00/38000; European Patents Nos. 1,099,207 B1 and 1,145,072 B1;

(e) Color formation and color adjustment; see for example U.S. Pat. Nos. 6,017,584; 6,664,944; 6,864,875; 7,075,502; 7,167,155; 7,667,684; 7,791,789; 7,839,564; 7,956,841; 8,040,594; 8,054,526; 8,098,418; 8,213,076; 8,363,299; 8,441,714; 8,441,716; 8,466,852; 8,576,470; 8,576,475; 8,593,721; 8,797,634; 8,830,559; 8,873,129; and 8,902,153; and U.S. Patent Applications Publication Nos. 2007/0223079; 2008/0023332; 2008/0043318; 2008/0048970; 2009/0004442; 2009/0225398; 2010/0103502; 2010/0156780; 2011/0164307; 2012/0182597; 2012/0326957; 2013/0141778; 2013/0242378; 2013/0258449; 2013/0278995; 2014/0055841; 2014/0226198; 2014/0240817; 2014/0340430; 2014/0362213; 2015/0118390; and 2015/0124345;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; 8,305,341; 8,314,784; 8,373,649; 8,384,658; 8,558,783; 8,558,785; 8,593,396; and 8,928,562; and U.S. Patent Applications Publication Nos. 2003/0102858; 2005/0253777; 2007/0091418; 2007/0103427; 2008/0024429; 2008/0024482; 2008/0136774; 2008/0291129; 2009/0174651; 2009/0179923; 2009/0195568; 2009/0322721; 2010/0220121; 2010/0265561; 2011/0193840; 2011/0193841; 2011/0199671; 2011/0285754; 2013/0063333; 2013/0194250; 2013/0321278; 2014/0009817; 2014/0085350; 2014/0240373; 2014/0253425; 2014/0292830; 2014/0333685; 2015/

0070744; 2015/0109283; 2015/0213765; 2015/0221257; and 2015/0262255;

(g) Applications of displays; see for example U.S. Pat. Nos. 6,118,426; 6,473,072; 6,704,133; 6,710,540; 6,738,050; 6,825,829; 7,030,854; 7,119,759; 7,312,784; and U.S. Pat. Nos. 8,009,348; 7,705,824; 8,064,962; and 8,553,012; and U.S. Patent Applications Publication Nos. 2002/0090980; 2004/0119681; and 2007/0285385; and International Application Publication No. WO 00/36560; and (h) Non-electrophoretic displays, as described in U.S. Pat. Nos. 6,241,921; 6,950,220; 7,420,549 8,319,759; and 8,994,705 and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

Electrophoretic and similar bistable electro-optic display media have until now been primarily used in electronic document readers (E-book readers), with some use in electronic storage media such as flash drives, portable computers, tablet computers, cellular telephones, smart cards, signs, watches, shelf labels, and variable transmission windows. However, the low power requirements, flexibility and light weight of electrophoretic and similar bistable electro-optic display media render them useful in numerous other applications, especially architectural, furniture and related applications.

SUMMARY OF INVENTION

In one aspect, this invention provides a tile comprising, in order, a light-transmissive front layer, at least one front electrode, an electro-optic layer capable of changing the color of the tile, and a plurality of rear electrodes, the exposed surface of the front layer being textured to provide a plurality of facets having a plurality of inclinations to the plane of the tile, and the plurality of rear electrodes providing at least one electrode located within each facet of the front layer.

These tiles of the present invention may be used as wall, ceiling or other tiles, or may be used in screens, dividers or similar devices. Alternatively, the tiles may be mounted on or within the surfaces of furniture and architectural fittings, including table tops, chairs, countertops, door and cabinets.

In the tile of the present invention, at least some (i.e., one or more), and preferably a majority, of the facets do not lie parallel to the plane of the electro-optic layer and of the tile itself "Inclining" some facets in this manner assists in the production of interesting visual effects, and also reduces the effects of any mis-alignment between the facets themselves and the rear electrodes. The individual facets themselves need not be strictly planar; they may be flat, or convex or concave outwards. Indeed, interesting visual effects can be produced by making the facets slightly concave outwards; especially under high powered lights, such concave facets can provide an illusion of a triplanar display, with the facets providing one image in front of the actual surface of the display and one apparently behind the display, in addition to the actual display surface. Similarly, we do not exclude the possibility that the transitions between adjacent facets might be in the form of curved areas rather than sharp edges.

As illustrated in the drawings and discussed below, the facets desirably vary in both size and shape, but desirably a majority of the facets are in the form of polygons, preferably irregular polygons, having from four to eight vertices. While the invention is primarily described below with reference to electro-optic media having only two colors, electro-optic media having more colors may be used; in particular, three and four color media capable of displaying black, white and one or two other colors (typically one or both of red and yellow) are known and may usefully be employed in the present tiles.

In the tile of the present invention, the plurality of rear electrodes provides at least one electrode located within each of the facets of the front layer. In one form of the tile, the rear electrodes may be of substantially the same size and shape as the facets of the front layer. Such an arrangement may be provided by having the backplane in the form of a printed circuit board having the electrodes mounted thereon; alternatively, a screen printed backplane could be used. However, it is not essential that there be only a single electrode behind each facet. For example, an active matrix backplane may be used, with the electrodes arranged in the usual matrix of rows and columns. Such an active matrix backplane may be used to create interesting optical effects in combination with the faceted front layer. Alternatively such an active matrix backplane may be driven so that all the electrodes lying within a single facet of the front layer are maintained at the same potential so that all these electrodes essentially form a single "virtual electrode" having the shape of the single facet. In commercial production, use of such an active matrix backplane, together with a controller capable of defining any desired pattern of virtual electrodes corresponding to any desired pattern of facets on the front layer, may be more economical than producing a plurality of types of backplanes each having a set of electrodes corresponding to the facet pattern on one type of front layer.

There are other ways in which more than one pixel electrode might be provided behind a single facet. In particular, if (as is commonly the case) individual tiles are square or rectangular, it may be advantageous to arrange the facets so that a facet on the edge of one tile aligns with a facet on the adjacent edge of the next tile, so that the two facets on adjacent tiles in effect form a single "compound" facet. To this end, the arrangement of the facets may be such that, when the tile is surrounded by other tiles having the same facet pattern, at least some of the lines dividing adjacent facets continue unbroken across the joins between adjacent tiles. Although of course this compound facet will be adjacent two separate pixel electrodes on the two separate tiles, it is advantageous to arrange the driving of the tiles so that these two pixel electrodes always remain at the same potential relative to their respective common electrodes, so that the two parts of the compound facet appear as a single facet, thus visually "breaking up" the straight line between the adjacent tiles and (when repeated over the edges between numerous adjacent tiles) giving the impression of a continuous sheet of color-changing paneling rather than an assembly of discrete tiles. Similarly, it is advantageous for the four facets in the corners of a rectangular tile to be arranged to as to form a single compound facet.

The electro-optic medium may be laminated directly on to the backplane.

As already indicated, in another aspect, this invention provides a wall, ceiling, floor, piece of furniture or architectural surface (all of which will hereinafter for convenience be referred to as "architectural surfaces") having fixed thereto or embedded therein an electro-optic layer capable of changing the color of the architectural surface. One form of such a variable color architectural surface comprises a tile (which may be a wall, ceiling or other tile) which may be used as a direct replacement for a conventional tile. Such a tile may comprise a light-transmissive (preferably essentially transparent) front layer, a front electrode, an electro-optic layer and a backplane. In one form of such a tile, the polymeric layer is textured to provide a plurality of facets, and the backplane is of the direct drive type having segments (pixel electrodes) aligned with the facets on the polymeric layer. The backplane may be in the form of a printed circuit board having the segments mounted thereon. The electro-optic medium may be laminated directly on to the printed circuit board backplane.

Tiles of the present invention intended for use as ceiling tiles may display a starry sky or similar pattern, and may be luminescent or phosphorescent. Alternatively, tiles may act as single pixels of a large display; such a display may provide paths leading persons to a specific area or destination, for example, the tiles may function as evacuation indicators in emergency situations, or the tiles may be used to form graffiti walls.

Tiles of the present invention intended for use as ceiling tiles may display a starry sky or similar pattern, and may be luminescent or phosphorescent. Alternatively, tiles may act as single pixels of a large display; such a display may provide paths leading persons to a specific area or destination, for example, the tiles may function as evacuation indicators in emergency situations, or the tiles may be used to form graffiti walls.

In another aspect, this invention provides a variable color writable board having a writable surface capable of being written on with a marker, and an electro-optic layer viewable through the writable surface, the electro-optic layer being capable of displaying at least two different colors, thereby enabling the appearance of the writable board to be changed. Typically, such a variable color writable board will be provided with manually operable switching means to enable a user to select the color displayed by the electro-optic layer. For example, the board may be made white or black and/or any one of a selection of colors.

Writable boards are commercially available, for example, as whiteboards, blackboards, chalkboards, and marker boards. Prior commercial variants of such boards are static such that the user cannot actively change a background color electronically. The information written on the board can be erased using an eraser.

The term "marker" refers to a device that enables the user to write on a writable board. A marker dispenses an additive colorant, that is a mixture of a subtractive colorant, which only absorbs light of certain colors, and a light-scattering medium which scatters all wavelengths of light. (A white marker for use on a blackboard may simply comprise a light-scattering medium without any colorant.) An "eraser" is a device that removes the layer of additive colorant deposited on to the writable board by the marker. This removal is accomplished by scraping or wiping or transferring the additive colorant material on to the material comprising the eraser.

In another aspect, this invention provides a method of guiding a user to a selected one of a plurality of locations within an area, the method comprising:

providing, at a plurality of locations within the area, a variable direction sign capable of displaying at least two different direction indicators;

providing the user with a portable token containing information identifying the selected location; and bringing the portable token adjacent one of the variable direction signs so that the one variable direction sign receives at least part of the information identifying the selected location, thereby causing the one variable direction to display a direction indicator appropriate to guide the user to the selected location.

In this method, information transfer between the token (which can conveniently be in the form of a credit card or hotel key sized device) and the variable direction indicators (signs) may be effected by direct physical contact, but the use of RFID or similar non-contact technology will generally be preferred.

Finally, in another aspect, this invention provides a room divider comprising: a plurality of color changing modules arranged in a plurality of rows and a plurality of columns, each module being arranged to display at least two different colors, each module being pivotally connected to at least one module in a row above or below its own, and also pivotally connected to at least one module in the same row; support means arranged to support the modules above a floor or below a ceiling; and control means arranged to control the modules so that at least some modules change color at times differing from those of other modules.

DETAILED DESCRIPTION

Figure 1:
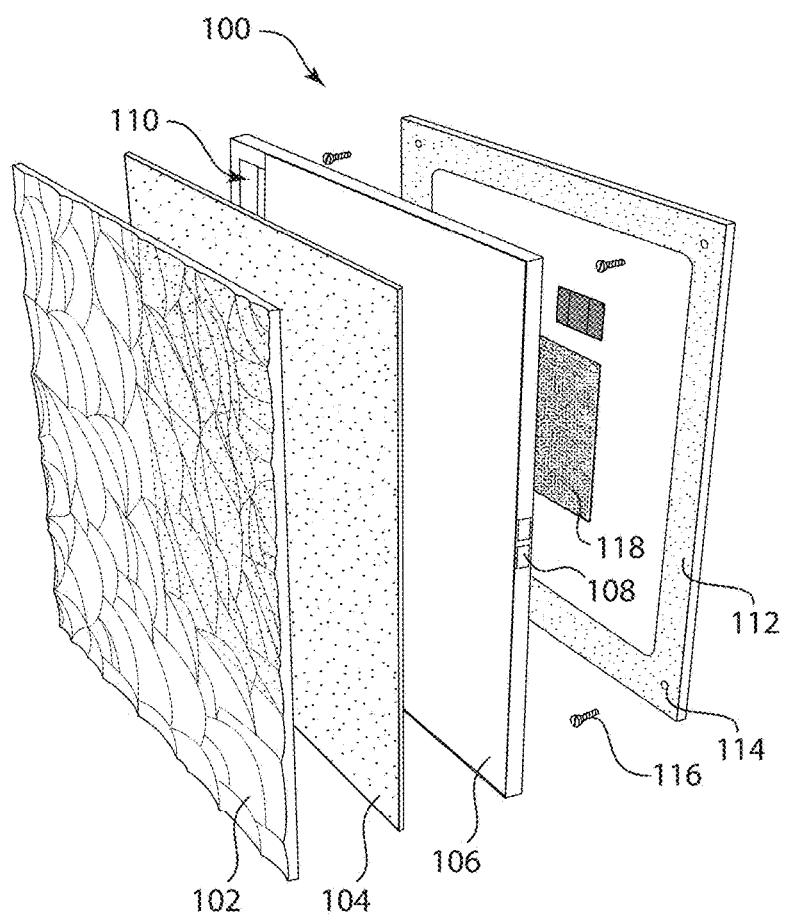
FIG. 1 is an exploded isometric view of tile of the present invention intended primarily for use as a wall tile.

As indicated above, the present invention provides a variety of devices which make use of electro-optic displays.

Although the various types of devices will mainly be described separately below, it will be appreciated that a single physical device may make use of more than one aspect of the present invention; for example, a variable color wall of the present invention could incorporate a variable color marker board of the present invention and/or variable directional signs of the present invention.

Variable Color Tile

As already mentioned, in one aspect this invention provides a tile comprising a light-transmissive (preferably essentially transparent) polymeric layer, a front electrode, an electro-optic layer and a backplane, the polymeric layer being textured to provide a plurality of facets, the tile further comprising a backplane of the direct drive type having segments (pixel electrodes) aligned with the facets on the polymeric layer. The backplane may be in the form of a printed circuit board having the segments mounted thereon. The electro-optic medium may be laminated directly on to the printed circuit board backplane.

It is well known that color greatly affects the mood of persons in a room, Blue and blue-white colors make rooms feel cooler and people more alert, where yellow and red colors tend to be warmer and create a more relaxed feel. Places of public accommodation such as hotels, conference centers etc., are well aware of these effects of color and often arrange lighting such that its color can be varied depending upon the type of event for which a venue is being used. The tile of the present invention can take this mood shifting one step further by enabling the actual colors walls, room dividers and other surfaces to be changed when desired. In addition, the present tile can provide effects not readily available from static paints or lighting; for example, the tiles can display ripples of color slowly moving across the wall, or an interesting "twinkling" effects as the various facets undergo color changes. In some cases, for example night clubs, the colors of the tiles, or the rate of change of such colors, might be changed dynamically to match the mood of music being played. For example, in the case of a large white/red display covering a substantial wall area (and similarly for other colors) a rapid shifting of red and white bands across the wall, with no use of intermediate colors, would convey a harsh, "edgy" atmosphere appropriate perhaps when rap music is being played, whereas a much slower, more graduated flow of bands across the display, with numerous intermediate shades being applied to ease the transition of a particular pixel from white to red, would convey a much more relaxed atmosphere.

The manner in which the divisions between the facets of the front layer may be used to hide the divisions between backplane electrodes has already been discussed above. Careful arrangement of the divisions between the facets may also be used for similar concealment purposes, for example to hide (or at least reduce the impact of) the gaps between tile or between adjacent backplanes. Similarly, careful manipulation of the divisions between the facets may be used to conceal visible mounting fixture or apertures in the tiles.

A specific embodiment of the tile of the present invention will now be described in more detail, though by way of illustration only, with reference to the accompanying drawings.

FIG. 1 is an exploded isometric view of a tile (intended primarily for use as a wall tile, and generally designated 100) of the present invention. The tile 100 comprises a transparent molded front plate 102, which is discussed in more detail below with reference to FIGS. 2 and 3, and which has a flat rear surface in optical contact with the flat front surface of an electrophoretic display module 104. Methods for establishing good optical contact between two planar surfaces such as those on the front plate 102 and the display module 104, including the use of optically clear adhesive, are well known to those skilled in optics and are described, for example in the aforementioned U.S. Pat. No. 6,982,178 (see especially FIG. 20 and related description).

The internal details of the display module 104 are omitted from FIG. 1 for clarity. However, the display module 104 may be substantially as described in the aforementioned U.S. Pat. No. 6,982,178 and comprise, in order from the front plate 102:

(a) a substantially transparent front (and typically polymeric—although glass and other similar material may be used) layer carrying a continuous substantially transparent front electrode which extends across the entire display module 104; the front layer and front electrode may be formed from a commercially-available polyethylene terephthalate film;
 (b) a layer of an encapsulated red/white electrophoretic medium;
 (c) a layer of lamination adhesive; and
 (d) a backplane bearing a plurality of discrete pixel electrodes (discussed in more detail below).

The display module 104 is mounted on a component chassis 106 provided with edge connectors 108 and an elongate aperture 110 which extends completely through the chassis 106. The chassis 106 is itself mounted on a mounting plate 112 provided at each corner with a cylindrical bore 114 through which a screw 116 can be inserted to hold the mounting plate 112 on a wall or other surface, or upon a wall rack comprising a series of parallel strips. A printed circuit board 118, which acts as a display controller for one or more tiles 100, is mounted in the center of the mounting plate 112 and electrical connectors (not shown) extend from the board 118 through the aperture 110 to each of the pixel electrodes of the display module 104 (so that the voltage applied to each pixel electrode can be individually controlled), and to the edge connectors 108. The board 118 may act as the controller for multiple tiles 100, or even an entire wall display, or may simply control one tile, with the edge connectors 108 being used to pass timing signals to synchronize the switching of the various tiles. The front plate 102, display module 104, chassis 106 and mounting plate 112 are each 12 inches (305 mm) square.

Figure 2:
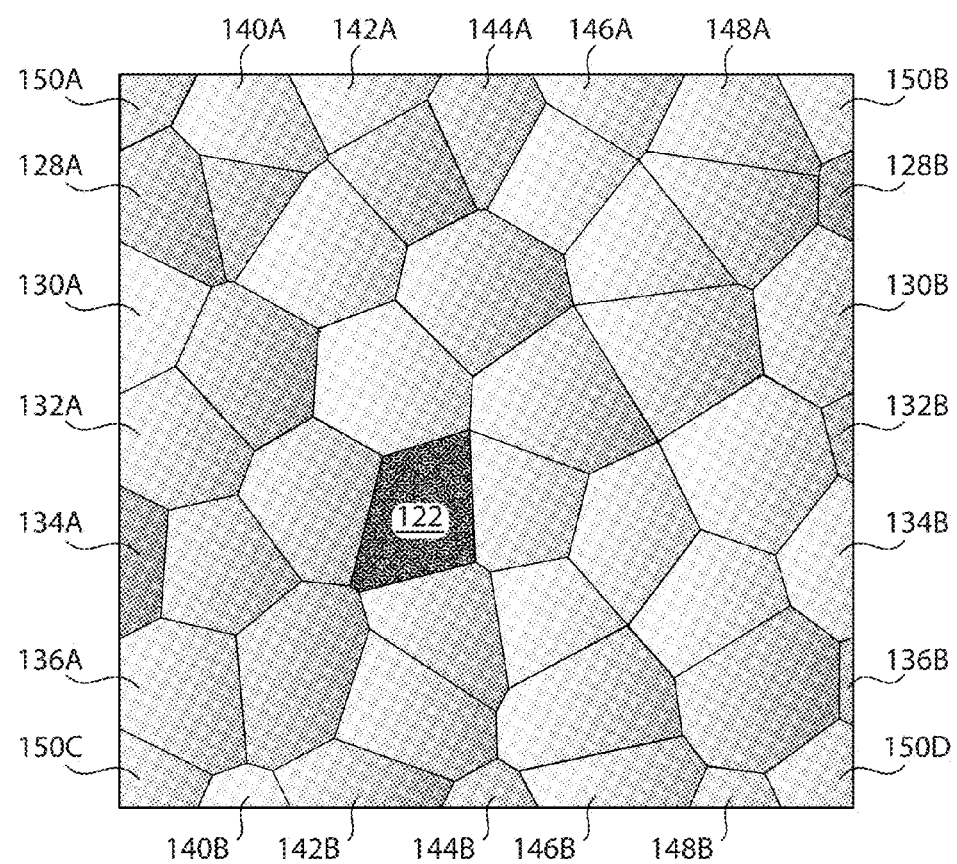
FIG. 2 is a front plan view of the polymeric layer of the tile shown in FIG. 1.
Figure 3:
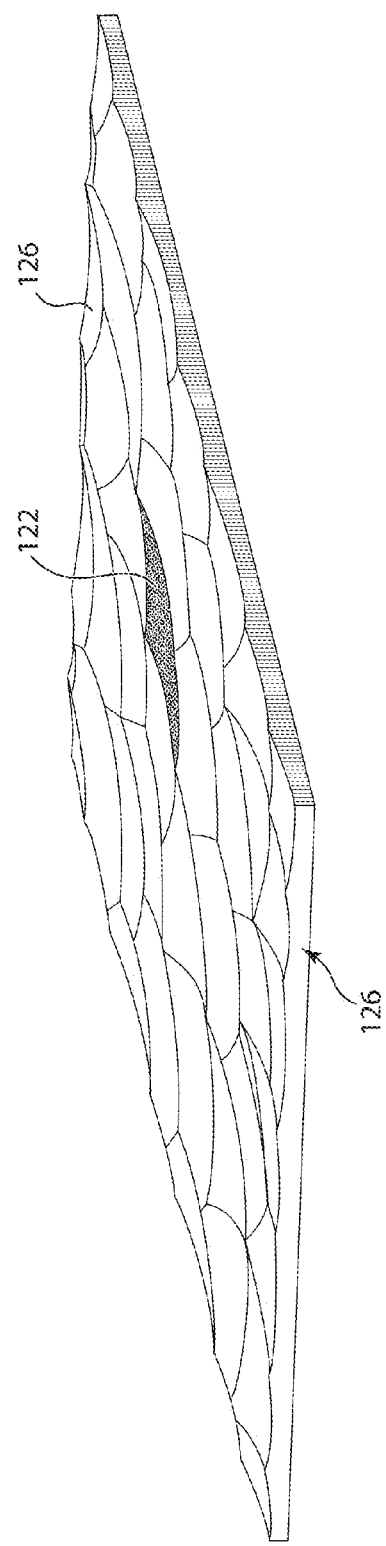
FIG. 3 is an isometric view of the polymeric layer shown in FIG. 2 from in front and to one side.

FIG. 2 is a front plan view of the front plate 102, with one facet 122 highlighted, and FIG. 3 is an isometric view of the front plate 102 from in front and to one side. The front plate 102 is, as already noted, 12 inches (305 mm) square and approximately 3/16-5/16 inch (approximately 5-8 mm) thick. The front plate 102 is conveniently formed by injection molding of a transparent polymer, for example poly(methyl methacrylate). As best seen in FIG. 3, the front plate 102 has a flat rear surface 124, while as best seen in FIG. 2, its front surface 126 (FIG. 3) is divided into a large number of essentially polygonal facets, each having from four to seven vertices and each of which is tilted so that it is not exactly parallel to the plane of the display module 104. As indicated in FIG. 3, the facets are not exactly planar, but are slightly concave outwards, for reasons discussed above. The pixel electrodes are arranged to that there is a single pixel electrode lying behind each facet of the front plane 102.

Figure 6:
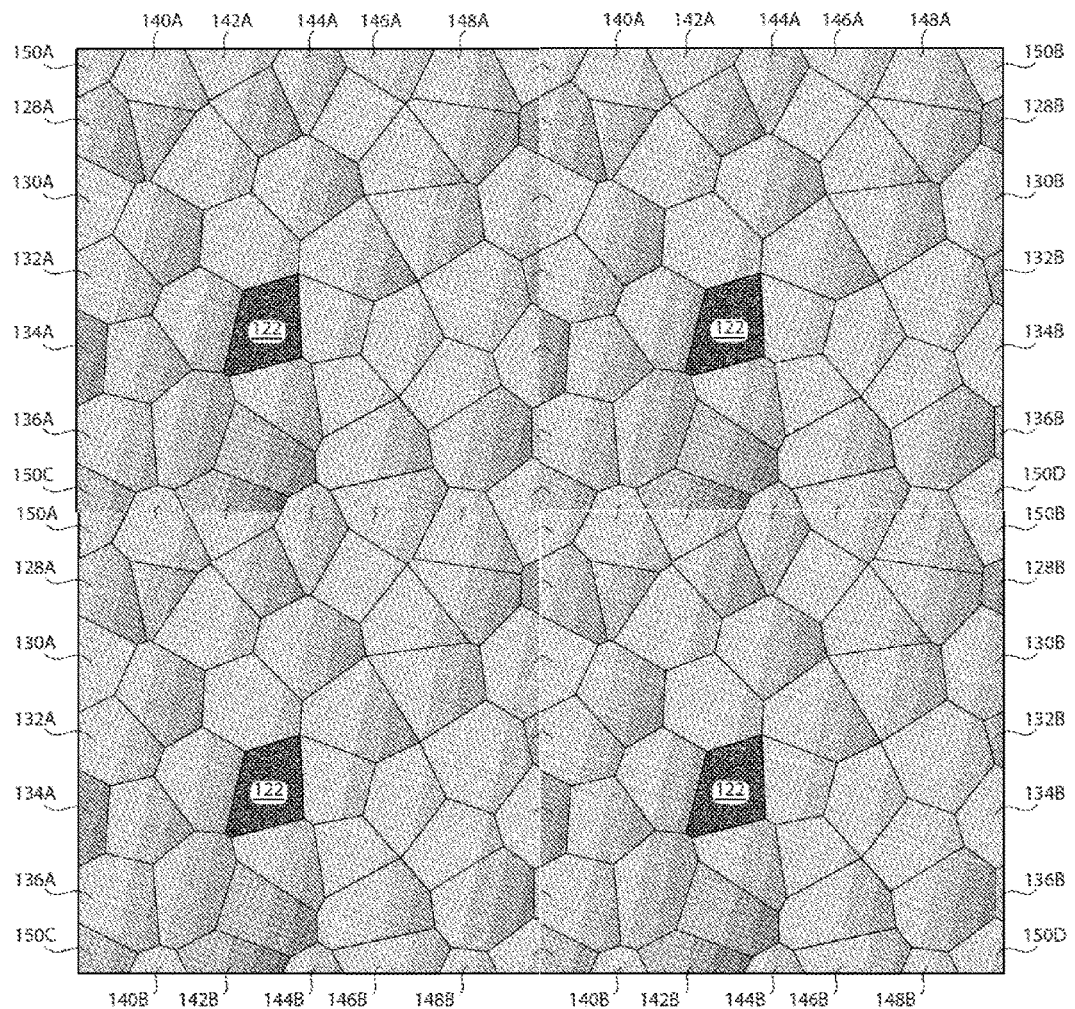
FIG. 6 is a front plan view of a plurality of the tiles shown in FIG. 1 in an installed condition.

As may be seen in FIG. 2, the arrangement of the facets on the front plate 102 is carefully chosen so that when the tile 100 is surrounded by other tiles of the same pattern and in the same orientation, the lines dividing adjacent facets continue unbroken across the joins between adjacent tiles, so that two facets, one on each adjacent edge, form in effect a compound facet, which is switched as a single unit, thus rendering the joins between tiles essentially invisible when the tiles are in operation undergoing color changes, and giving the impression of a single continuous display. Specifically, the pairs of facets 128A/B, 130A/B, 132A/B, 134A/B, 136A/B, 138A/B, 140A/B, 142A/B, 144A/B, 146A/B and 148A/B all form such compound facets, while the four corner facets 150A/B/C/D together form a four-element compound facet, as illustrated in FIG. 6.

As already indicated, the tiles of the present invention may be driven in a variety of ways. For example, a panel comprising a rectangular array of tiles may start as a solid block of one color and then individual pixel electrodes are switched one at a time (except that pairs or larger numbers of pixel electrodes associated with a compound facet are switched simultaneously) to the second color such that a band of the second color progresses in an irregular manner across the display. Eventually, the entire panel may be in the second color. Alternatively, after a substantial portion of the panel has been driven to the second color, a band of the first color may start to appear at the edge from which the second color "emerged" so that alternating bands of the two colors can follow each other across the panel. In either case, as previously noted the visual effect can be markedly altered by changing the speed at which the bands progress and whether or not intermediate levels of color are used to spread out the transitions between the two colors. Further possibilities include a "twinkling" effect by keeping most of the pixels at the same (background) color and randomly switching a small proportion of pixels to the other color, then back again, and a "firefly" effect, where again most of the pixels are kept at the background color but at various points first and second adjacent pixels are switched to the second color, then a third pixel, adjacent to the second, is switched to the second color while the first pixel is returned to the background color, so that the two-pixel "firefly" appears to execute a random dance around the panel. Other driving methods may of course be used, and additional complications in the driving method are possible if more than two colors are available.

Variable Color Writable Board

As already mentioned, in one aspect the present invention provides a writeable board with an electro-optic color-changing background. A variety of electro-optic materials, both emissive and reflective, may be used in such a board but reflective media are generally preferred. For example, organic light emitting diodes (OLEDs), encapsulated liquid crystals, for example polymer-dispersed liquid crystals, and electrochromic media may all be used in the present invention, however, the preferred embodiment uses an encapsulated, polymer-dispersed or microcell electrophoretic imaging medium. In the variable color writeable board of the present invention, the reflective or absorptive layer in a conventional whiteboard or blackboard is replaced by a layer of electro-optic medium, and a marking medium comprised of an additive colorant (a subtractive colorant and a highly scattering medium) is applied to the exposed surface of the display.

By creating a writing board which the user can make white or colored, users are given the flexibility to choose properties previously only available in separate boards. A variable color writeable board can be used as a blackboard (chalkboard) when the higher contrast and haptic feedback function of a blackboard is desired, or used as a whiteboard where users want to display information via interactive projection (i.e., to use the board as a projection screen) or seek to increase the vividness of colored writing.

A protective layer (a layer of light-transmissive and preferably transparent material) may be placed between the electro-optic layer and the viewing/writing surface to protect the electro-optic layer from mechanical or other damage. The protective layer may be the writable layer itself or may be a separate layer disposed between the electro-optic layer and the writable layer. The viewing/writing surface of the display may be surface treated (roughened) to allow the additive colorant to deposit easily from the marker. Alternatively, an electro-optic film similar to the front plane laminate described in the aforementioned U.S. Pat. No. 6,982,178 may be used in the present invention in conjunction with a suitable backplane and with a protective layer placed between the electro-optic film and the writing surface to protect it from damage and/or scratching.

An "optical coupling layer" (a layer of material chosen to reduce light losses) may be placed between an electro-optic layer and a protective layer, or, if an electro-optic film is employed, between the electro-optic film and a protective layer to reduce the light losses between the two surfaces.

A mechanical support structure ("device frame") may be used to hold the writable board assembly together and to anchor it to any architectural surface (wall, door, etc. . . . ) of the user's choice. Displays may also be attached to a structure via lamination, frame holders, screws (preferably electrically non-conductive screws) or other known means.

Figure 4:
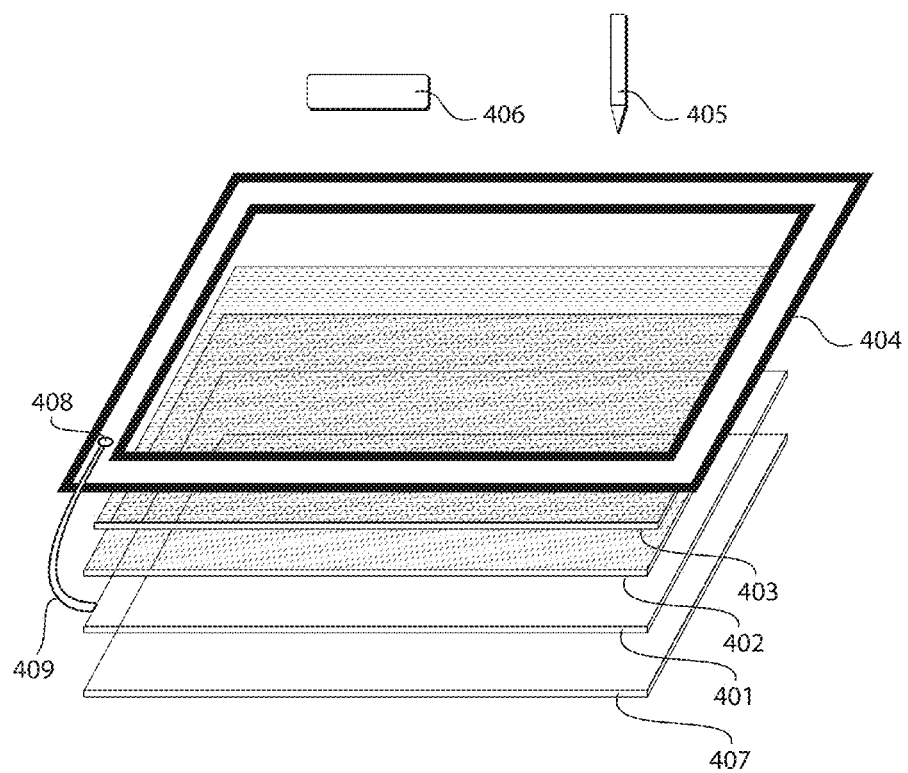
FIG. 4 is a schematic exploded three-quarter view of a writable board of the present invention viewed from in front, above and to one side.

FIG. 4 is a schematic exploded of one writable board of the present invention showing the multiple layers of a variable color writeable board. A first layer (401), an electro-optic film, is placed adjacent the rear surface of the display. The electro-optic film may be driven via a common front electrode and a backplane that may be in form of a single rear electrode, a segmented (direct drive) backplane (in which each segment is provided with an individual conductor to control the voltage of the segment) or an active or passive matrix backplane. (Not all types of electro-optic medium are usable with all types of backplane.) The electro-optic layer contains an encapsulated electrophoretic medium capable of achieving electrically tunable optical states of varying color and reflectivity. The construction of the electro-optic layer and its lamination to the desired backplane may be accomplished via techniques known in the art. The layer (401) also has a bus (409) whereby electrical connections to the circuitry needed to drive the display can be made.

A second layer (402) termed the optical coupling layer, which is comprised of an optical coupling adhesive or optically clear adhesive, is disposed above the first layer (401). The layer (402) may be attached to the first layer (401) using techniques known in the art. The purpose of the second layer is to reduce the optical losses between the first and third layers.

A third layer (403), also called the protective layer, is disposed above the second layer. The purpose of the third layer is to mechanically shield the layers below it. Materials used in this layer are well known in the art. Materials like glass, acrylic, and polycarbonate are used extensively in the marker board/chalkboard industry. The surface of the third layer is treated so as to receive the additive colorant and enable its removal with an eraser. The third layer may also be patterned via a printing process or decal on the back to create decorative, aesthetic or functional accents.

A fourth layer (404), also known as the device frame, is placed around the first, second and third layers. The purpose of the fourth layer is to provide a means of mechanically supporting the device and anchoring it to an architectural surface. Numerous ways of constructing such a frame are known in the art. The layer may also have specific shape and form to permit decorative, aesthetic or functional enhancements. This layer also has a place to house the electrical circuitry (408) needed to drive the electro-optic layer; alternatively, instead of accommodating the drive circuitry itself, this layer may accommodate a wired electrical connector or a wireless connection device (for example, a Wifi or Bluetooth module) for relaying data to or from remote drive circuitry. The frame may house a digitization device (known in the art) needed to capture the marker position and an interactive projector for displaying information on the board. A marker (405) is comprised of a dispenser of additive colorant which can transfer on to the third layer and produce writing of the user's choice. A number of commercially available technologies can fulfil this role. For example, chalk manufactured by "Chalk Ink" etc. may be used for this purpose. The marker may also be part of an electronic digitization solution. Such solutions are known in the art. An eraser (406) is comprised of a spongy material. This device can be used to remove the additive colorant dispensed by the marker from the third layer. Many means of achieving this are known in the art.

The board shown in FIG. 4 may be assembled by placing the desired aesthetic pattern or decorative decal on the back of the third layer (403), adhering the first (401), second (402) and third (403) layers together using any means known in the art, electrically connecting the first layer (401) to the drive electronics and housing the electronics in the fourth layer (404).

Alternatively, a fifth layer (407) may be added behind the first layer (401). The purpose of this layer is to add mechanical support or additional properties as desired. For example, the fifth layer (407) may be a steel layer placed behind the first layer to create a writable board that also has magnetic properties to magnetically attach accessories associated with magnetic boards known in the art. In another alternative, the choice of materials in the first (401), second (402), third (403), fourth (404) and fifth (407) layers may be such that the entire device is flexible and/or can be molded on to a curved surface.

As already mentioned, the third layer may also be patterned via a printing process or decal on the back to create decorative, aesthetic or functional accents. For example, a portion of the third layer may be used to display a glyph (such as name, abbreviation, trademark, logo, seal or heraldic achievement) of the institution in which the board is located). However, greater flexibility may be achieved by using a portion of the electro-optic layer itself (for example, one corner of the display or a strip along one edge of the display) to display the desired glyph. Known overlay techniques familiar from television broadcasts may be applied to the drive circuitry of the electro-optic layer such that a portion of the display is reserved for the glyph and does not change with the rest of the display. Alternatively, the drive circuitry may be arranged so that the pixels comprising the glyph remain constant regardless of the colors changes applied to the surrounding pixels, or are always in a color state contrasting with the surrounding pixels regardless of the color changes applied to those surrounding pixels. Provision of an "electronic glyph" in any of these ways has the important advantage that the glyph can be changed to accommodate different users; for example, a board at a conference center could display a glyph associated with the specific conference or sponsor of the event taking place at any time.

As discussed in more detail below, electro-optic media may usefully be employed to provide color varying permanent or temporary walls and similar structures (such as room dividers and screens), ceilings, floors and surfaces of furniture and other building fittings. Variable color writable boards of the present invention offer the possibility of providing a writable board which essentially vanishes when not in use. If the writable board is mounted essentially flush with the surrounding wall, screen or other surface (for example, the surface of a variable directional sign or of a file cabinet), and appropriate drive circuitry and switch are provided), the writable board, when not in use, can undergo the same color changes as the surrounding surface and will thus appear to be a part of that surface. When the writable board is required to function as such, the switch is thrown and the writable board then functions independently of the surrounding surface.

Other Architectural and Furniture Applications

The light weight and low power consumption of electrophoretic and similar electro-optic displays render them very suitable for use in room dividers, especially room dividers which are suspended from above. Such room dividers may have the form of a plurality of tiles connected to each other by connectors which permit relative movement between the tiles. Such multi-tile room dividers allow for visually interesting configurations; for example, even though the room divider is suspended at intervals from a linear rail, the divider may assume a serpentine or similar curved configuration.

Electro-optic displays may be especially useful in sculptures, including suspended sculptures and mobiles. The provision of color changing technology can greatly enhance the esthetic experience of sculptures, especially when combined with the physical movement of mobile sculptures.

Furniture surfaces which may be enhanced by the present invention include table tops, chairs, countertops, door and cabinets. An electro-optic medium may be laminated or otherwise attached by known methods to an exposed surface of the furniture or may be embedded within the article, for example a door, table or cabinet, by known methods of placing the electro-optic medium and associated electrodes within a cavity, filling the cavity with a polymerizable medium and then subjecting the polymerizable medium to conditions, such as heat or exposure to radiation, which could the polymerizable medium to polymerize, thereby embedding the electro-optic medium and electrodes with a light-transmissive polymer. Alternatively, the electro-optic medium and electrodes may be laminated between two sheets of glass or other light-transmissive material. As with writeable boards, architectural surfaces may usefully incorporate an optical coupling layer to reduce light losses between the two surfaces.

Incorporating electro-optic displays into furniture in accordance with the present invention can accomplish far more than providing improved esthetic appearances; the electro-optic displays can enhance the functions of the furniture. For example, provision of an electro-optic display in a coffee table not only enables interesting effects using color changes in the table but can also enable the table to function as a games table; the upper surface of the table could display games board, for example chess/checkers, backgammon or cribbage. Note that such a table, especially if provided with touch sensing capability, could provide more than the board for a game; the table could also display the game pieces and permit them to be moved. A restaurant table could display the menu and wine list. An arm of a chair could be provided with a display an infra-emitter to act as a remote controller for a television and/or other electronic device.

Another use for which electro-optic media are well-adapted is information sharing. Many public spaces, such as streets, plaza, parks, university campuses, conference centers, places of public assembly etc., are replete with directional and other signs, for which there is an obvious need in any place frequently by people not familiar with the location. Many such signs need to be of substantial size so as to be readily readable from a significant distance. However, the presence of many large signs gives rise to "visual clutter" which many people find objectionable. Furthermore, many signs need to convey different information to different groups of users. For example, on a university campus where most students are familiar with the general layout of the campus, it may be sufficient for a sign to announce that a particular meeting is taking in (say) "Smith's Theater" since students may reasonably be assumed to know the location of Smith's Theater. However, when parents descend on the campus for Parents' Weekend, they will not know the location of Smith's Theater and the sign really needs to display a map of the campus with the location of Smith's Theater highlighted.

Signs using electro-optic media in accordance with the present invention can meet many of the problems with conventional fixed directional and other signs. When not in immediate use, the signs can be rendered inconspicuous by being set (mostly) to a color which blends into the background, leaving just a small area, marked perhaps with a question mark, which a user presses to activate the sign. The sign could then display a menu, which could be multi-tiered, asking the user to indicate what information is desired. Some pages of displayed information could include prompts asking if further information is desired; for example, a list of that day's meetings and corresponding rooms could include an option for "Is campus map desired?" The menu could also ask the class of user (for example, freshman student, upper classman or parent) and vary the displayed pages depending upon this class.

The ability to customize the displayed page depending upon the user can be enhanced if the display is provided with some sensor capable of receiving information from a portable token (for example, a boarding pass or hotel room "key") carried by a user. Such information exchange between a sign and a portable token can readily be carried out by RFID, Bluetooth or other known technologies. For example, a guest in a hotel or a patient in a hospital can be issued with a card customized to the room to be occupied or visited. As the guest/patient traverses the corridors of the hotel/hospital, he places the card adjacent a sign found at each corridor intersection, whereupon the sign changes to indicate the direction in which he should proceed.

The effect of color changes on users of enclosed spaces has been discussed above. However, color changes on architectural surfaces may serve more than esthetic purposes. With fixed color walls and doors, it is often necessary to deploy numerous signs, and possibly to mark off areas with safety tape, when an area of a building has to be closed to the public or to other than a selected group of people (for example, construction workers). Storing and deploying the necessary signs and tape is a labor-intensive process. If both color changing walls and doors are provided, an area of the building can be closed by (say) setting the walls and doors to a red color and displaying a "Danger—No unauthorized persons" or similar warning on the doors.

Figure 5:
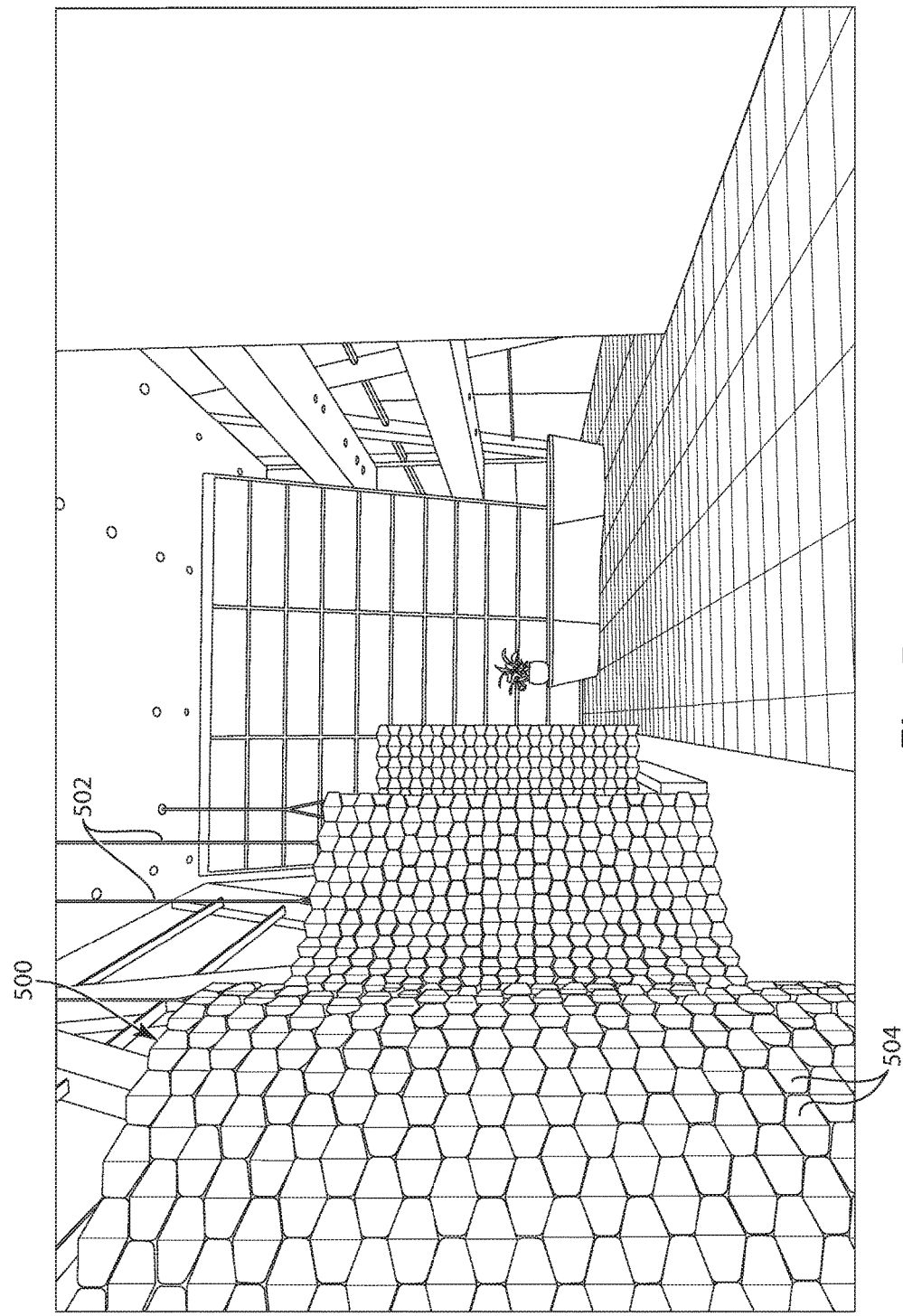
FIG. 5 is an elevation of a room divider of the present invention.

As previously noted, the light weight and low power consumption of electrophoretic and similar electro-optic displays render them very suitable for use in room dividers, especially suspended room dividers; such dividers may have the form of a plurality of tiles connected to each other by connectors which permit relative movement between the tiles. FIG. 5 illustrates such a divider, generally designated 500. The room divider 500 is suspended from a linear rail (not shown) by a plurality of supports 502, each of which can be in the form of a conduit housing data and power cables. (Alternatively, data communication to the divider may be by wireless transmission and power may be generated internally by photovoltaic cells.) The divider consists of a large number of flat, hexagonal modules 504 each of which is switchable between yellow and white (and is capable of displaying intermediate shades). Although not easily seen in FIG. 5, each hexagonal module 504 is supported from above by two vertical connectors passing through the midpoints of its two upper edges, these vertical connectors permitting the two modules which they join to rotate relative to one another. Two similar vertical connectors enable each module to support the module below. Each module 504 is also pivotably connected via its side edges to the modules on either side. The vertical connectors permit data to pass between the modules which they link. Control of the various modules by a controller (not shown) may be by master/slave techniques or by cascading techniques. The controller may be preloaded with sequences that may be selected by a user, or may be actively updated to change/reload the programming.

As will be seen in FIG. 5, although the supports hang from a linear rail, the flexible connections between the various modules 504 permit the overall configuration of the room divider 500 to deviate from the vertical plane containing the rail. The divider 500 may assume a serpentine configuration as shown in FIG. 5, or a different curved configuration, with the change of configuration typically being effected manually.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:
1. A plurality of tiles, each tile comprising, in order:
a light-transmissive front layer;
at least one front electrode;
an electro-optic layer capable of changing the color of the tile; and a plurality of rear electrodes,
wherein an exposed surface of the front layer includes a plurality of facets along at least one edge of each tile having a plurality of inclinations to a plane of the exposed surface of the tile and when the plurality of tiles are in an installed condition, the plurality of facets along the at least one edge of adjacent tiles form a plurality of irregular polygonal shaped compound facets switching as a single unit at a joint between the adjacent tiles, at least some lines dividing adjacent facets continue unbroken across the joints between adjacent tiles and obscure the joint.
2. The plurality of tiles according to claim 1 wherein the majority of the facets do not lie parallel to the plane of the electro-optic layer.
3. The plurality of tiles according to claim 1 wherein at least one of the facets is concave outwards.
4. The plurality of tiles according to claim 1 wherein the irregular polygonal shaped compound facets have from four to eight vertices.

5. The plurality of tiles according to claim 1 wherein the backplane has the form of a plurality of discrete electrodes each of which is substantially aligned with one of the facets of the front layer.

6. The plurality of tiles according to claim 1 wherein the backplane is an active matrix backplane having a matrix of electrodes arranged in a plurality of rows and a plurality of columns.

* * * * *